Figure 1:
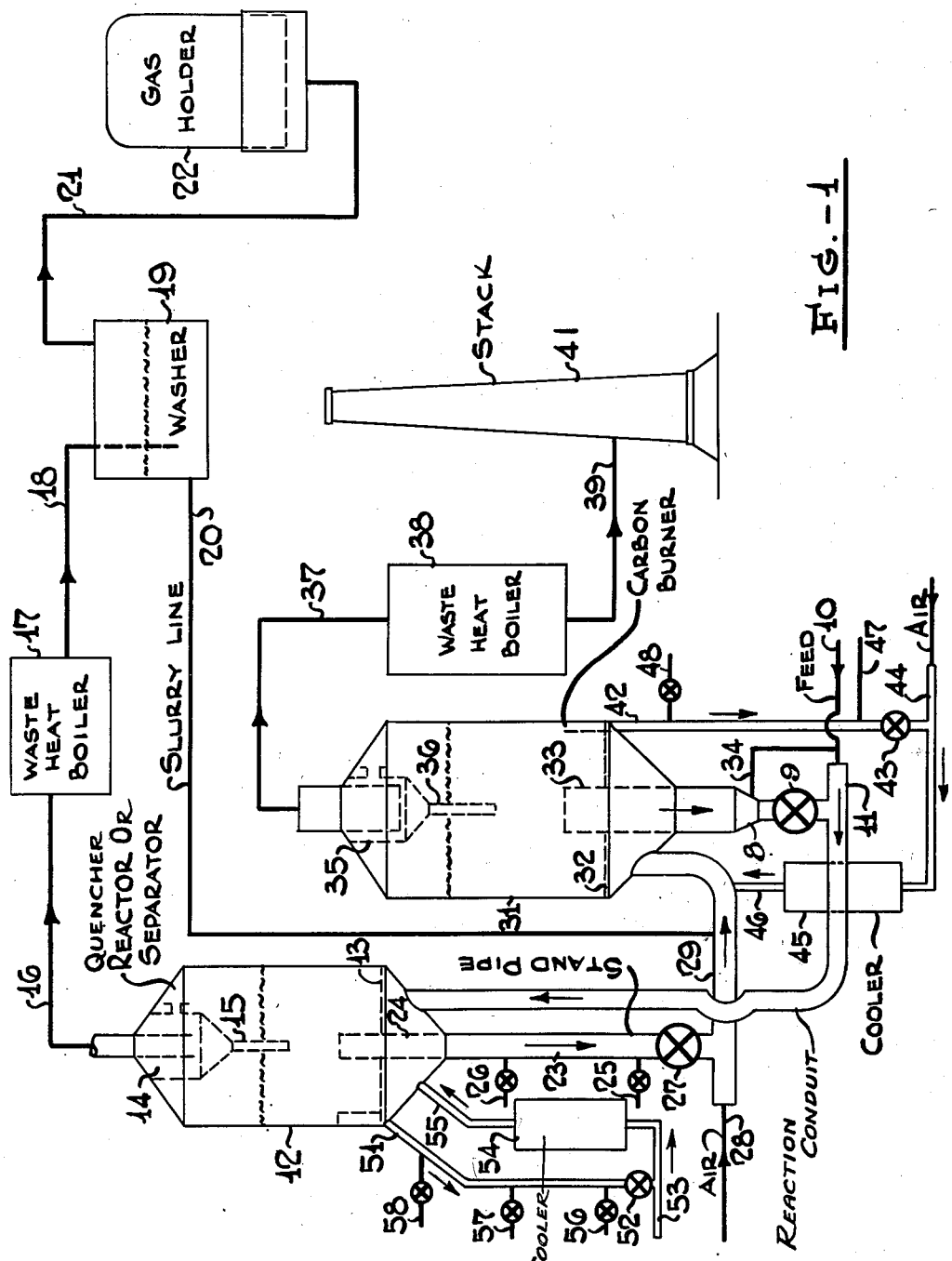

May 24, 1949.  E. J. GOHR  2,471,104
PRODUCTION OF UNSATURATED HYDROCARBONS AND HYDROGEN
Filed Nov. 10, 1944  2 Sheets-Sheet 1

Edwin J. Gohr Inventor
By _____ Attorney

May 24, 1949.  E. J. GOHR  2,471,104
PRODUCTION OF UNSATURATED HYDROCARBONS AND HYDROGEN
Filed Nov. 10, 1944  2 Sheets-Sheet 2

Edwin J. Gohr Inventor
By P. L. Young Attorney

Patented May 24, 1949

2,471,104

UNITED STATES PATENT OFFICE 2,471,104

PRODUCTION OF UNSATURATED HYDRO-CARBONS AND HYDROGEN

Edwin J. Gohr, Summit, N. J., assignor to Standard Oil Development Company, a corporation of Delaware Application November 10, 1944, Serial No. 562,856

7 Claims. (Cl. 260—679)

This invention relates to the production of hydrogen or acetylene and other highly unsaturated hydrocarbons from petroleum oils and gases.

It has heretofore been proposed to produce hydrogen from methane or other low-molecular weight hydrocarbons by high temperature cracking treatment, such as of the order of from 1800° F. to 2600° F. The ultimate products of this reaction are hydrogen and carbon.

In view of the high temperatures involved, it has been the practice in the past to carry out the operation in an alternate blow-and-run type of process in which the hydrocarbon gas is first passed over highly heated refractory brick which may be in the form of checkerwork. The operation is continued until the temperature is reduced below the desired level, after which the stream of gas is interrupted and the refractory brick is again heated by burning the carbon formed on the brick during the reaction period. Following this, the cracking of the hydrocarbon gas is renewed. This alternate blow-and-run type of process has a number of inherent objections. One objection is that where hydrogen of relatively high purity is required a portion of the hydrogen formed during the initial portion of the cracking stage of the cycle must be rejected because it is contaminated by nitrogen, carbon dioxide and other combustion gases which are absorbed on the brick during the burning operation.

Another objection to this method is that the cracking stage of the cycle is carried out at fairly rapidly fluctuating temperatures due to the highly endothermic nature of the process, and consequently it is not possible to carry out the treatment at a uniform temperature level best suited for the production of hydrogen.

This same general type of alternate blow-and-run operation has also been used for the high-temperature cracking of hydrocarbon gases and liquids to form acetylene and other secondary products, such as ethylene, benzene, methane, and heavier hydrocarbons. In this latter process it is necessary to hold the gases at reaction temperature for a relatively short time in order to prevent the hydrocarbons from being completely converted into hydrogen and carbon.

One of the principal objects of the present invention is to provide an improved process for the high-temperature cracking of hydrocarbon gases and liquids to form hydrogen or highly unsaturated hydrocarbons, such as acetylene, or both.

Another more specific object is to provide an improved method or process for producing hydrogen from methane.

Another more detailed object is to provide a continuous process and apparatus for converting hydrocarbon gases and vapors into hydrogen and unsaturated hydrocarbons, such as acetylene, wherein the reaction is carried out at substantially uniform temperature level.

Other more detailed objects and advantages of the invention will be apparent from the description hereinafter in which reference will be made to the accompanying drawing wherein Fig. 1 is a partly schematic illustration of one form of apparatus forming a part of the present invention and capable of carrying out the process phases of the invention, and Fig. 2 constitutes a modified form.

In accordance with the present invention, the reaction zone in which the high-temperature cracking treatment of the hydrocarbons is carried out is maintained at the proper temperature by continuously circulating a highly heated powder through the cracking zone at a rate sufficient to maintain a substantially uniform temperature within the zone. The powder is maintained at the required temperature by passing it through a separate heating zone wherein the powder is heated by combustion of the carbon carried out of the reaction zone with the powder or other combustible material which may be injected into the heating zone. By heating the powder in a zone separate and independent of the reaction zone and by circulating the powder at a sufficient rate to maintain a uniform temperature level, a higher yield of desired reaction products, such as hydrogen and acetylene, may be obtained having a higher degree of purity.

The powder employed as a heat-carrying medium for the reaction may be any inert refractory material, such as carbonundum powder, brick dust, purified sand, silica, and powdered metals and alloys. Instead of the powder being inert to the reaction, the powder may be of a composition such as to act as a catalyst for activating the reaction. Such catalyst may comprise, for example, metals of group VIII of the periodic table supported on suitable inert carriers of the type mentioned.

For a better understanding of the invention, reference will be made to the accompanying drawing in which the invention will first be described as applied to the cracking of methane to form hydrogen.

Referring to Fig. 1, reference character 10 designates a feed line through which the gas to be cracked, for example, methane, is introduced into the equipment. Prior to introduction, the methane may be preheated to a temperature of from 500° F. to 1000° F. by any suitable means, such as an exchanger or furnace, which, for simplicity, has not been illustrated in the drawing. The methane introduced through line 10 discharges into a conduit 11 into which highly heated powder from conduit 8 also discharges at a controlled rate through a valve 9. The amount and temperature of the powder introduced into the stream of methane are sufficient to heat the mixture to the desired temperature and supply the necessary heat for cracking the feed. For example, in the cracking of methane to form hydrogen, the reaction temperature may be of the order of from 1800° F. to 2600° F., and preferably about 2400° F. to 2500° F. The powder is heated to a temperature above the desired reaction temperature prior to the introduction into the methane stream. For example, when cracking at a temperature of about 2100° F. with a hot powder at a temperature of 2600° F., from 1300 to 2100 lbs. of solid will be required for each 1000 cubic ft. of methane, depending upon the specific heat of the powder being used. By increasing the relative amount of powder discharging into the gas stream, the temperature difference between the hot powder and the desired reaction temperature can be correspondingly reduced. For example, if the temperature of the hot powder is maintained at 2300° F. rather than 2600° F., as previously mentioned, twice the amount of powder must be circulated to maintain the reaction temperature at 2100° F. In many cases it is desirable to maintain a relatively low differential between the powder temperature and the reaction temperature and circulate relatively larger amount of powder.

The suspension of hot powder and methane continues through the conduit 11 into the bottom portion of cracking vessel 12 through which the suspension passes into the main body of the cracking vessel. The section of the cracking vessel below the grid 13 may be in the form of an inverted cone which serves as a distributing zone for distributing the hot gas and powder over the full cross-sectional area of the vessel.

For reactions not requiring a short contact time, the diameter of the cracking vessel is preferably designed so that the velocity of the gases rising through the intermediate section of the vessel will be sufficiently low to form a relatively dense layer of powder above the grid 13, as illustrated. This layer of powder will be maintained in a dense, turbulent state by the gases rising therethrough. By maintaining the powder in a turbulent state within the cracking vessel, a substantially uniform temperature throughout the length and breadth of the vessel may be maintained for carrying out the cracking reaction. The depth of the layer of powder above the grid 13 is controlled to give the required contact time for effecting the cracking reaction. The reaction products comprising hydrogen and unreacted methane upon issuing from the upper level of the vessel 12 are passed into a suitable separating device as, for example, a cyclone separator 14 positioned in the cracking vessel 12 wherein the entrained powder is separated from the reaction products. Other convenient separating devices may, of course, be substituted for the cyclone separator. The powder so separated discharges back into the cracking vessel 12 through conduit 15. The reaction products issue from the reaction vessel 12 through line 16 and pass to a waste heat boiler 17 of conventional design in which the products are cooled and the heat liberated is converted into steam. The cooled gaseous products from the waste heat boiler 17 pass through line 18 to a washer or hydraulic main 19 in which they are quenched with water or other scrubbing medium to remove the final traces of powder therefrom. The gases from the washer 19 then pass through line 21 to a gas holder 22. These gases may be subjected to any desired processing for separation of the hydrogen from unconverted methane and other by-products formed during the cracking operation by conventional methods such as fractionation or diffusion.

A slurry of powder separated from the reaction products may be withdrawn from the washer 19 through line 20. Powder is continuously withdrawn from the cracking vessel 12 through a vertical conduit 23 having an extension 24 projecting upwardly into the vessel beyond the grid plate 13. If desired, steam, methane, hydrogen, or other gasiform material may be introduced into the conduit 23 through one or more spaced lines 25 and 26 to serve as a stripping agent for removing volatile hydrocarbon products from the powder and to maintain the powder in a freely flowing fluidized state capable of generating a hydrostatic pressure at the base of the column 23. The powder withdrawn from the vessel 12 through conduit 23 discharges through a control valve 27 at a regulated rate into a stream of air introduced through line 28. The mixture of air and powder which contains the carbonaceous material formed by cracking of the methane is passed through conduit 29 into a carbon burner 31 in which the carbon is burned from the powder and the powder is again reheated to the desired temperature for carrying out the cracking reaction. The carbon burner 31 is, in this instance, of the same general construction as the cracking vessel 12, so that it is unnecessary to describe this apparatus in detail.

The suspension of air and powder containing the carbon is discharged into the bottom section of the carbon burner 31 below a grid plate 32 through which the suspension passes into the main section of the burner. The diameter of the carbon burner is also designed so that the velocity of the air and combustion products rising through the burner is sufficiently low to cause the powder to settle into a relatively dense layer in the bottom section of the burner. This layer is maintained in a state of violent agitation by the gases rising therethrough. To attain these ends, the superficial velocity of the air in the carbon burner 31 and the superficial velocity of the methane in the cracking vessel 12 may be of the order of from 0.5 to 2 feet per second, depending upon the size of the powder particles, the specific gravity, and other factors. The hot powder discharges from the carbon burner 31 into conduit 8 which is similar to conduit 23 previously described which has a projection 33 extending upwardly into the burner above the grid plate 32.

In order to maintain the powder within the conduit 8 in a fluid state and also to remove combustion gases which may be entrapped in the powder, a small portion of the feed or other gas may be introduced at one or more points into the conduit 8, such as through line 34. The combustion products issuing from the upper layer of the powder in the carbon burner 31 may pass to a suitable separator such as a cyclone separator 35 positioned in the top of the burner in which entrained powder containing the combustion gases may be separated. The powder so entrained may be discharged back into the burner through the conduit 36. The combustion gases from the burner 31 after passing through the cyclone separator 35 are passed through line 37 to a waste heat boiler 38 for recovery of heat therefrom, and are afterwards discharged through line 39 into a stack 41.

In cases where the powder employed is relatively inexpensive, the separating devices 35 and 14 may be omitted.

The cracking vessel may be operated at substantially atmospheric pressure except for the pressure necessary to overcome the pressure drop through the waste heat boiler, the washer 19 and adjoining lines, or it may be operated at a substantial superatmospheric pressure. The latter is of particular advantage in cases where hydrogen is to be employed for high or moderate pressure hydrogen processes, such as in ammonia synthesis or oil hydrogenation. The carbon burner 31 may be operated at substantially the same pressure level as the cracking vessel 12. The pressure lost during circulation of the powder through the carbon burner and cracking vessel may be restored by providing the conduit 23 of sufficient height to generate a "fluistatic" pressure sufficient to overcome the pressure difference between the cracking vessel and the carbon burner and the pressure drops through the respective vessels. In order for the conduit 23 to serve as a standpipe, it is necessary that the powder be maintained in a fluid condition. This is preferably accomplished by maintaining a small amount of a fluidizing gas in intimate mixture with the powder flowing downwardly through the conduit.

In the event that more carbon is formed than is necessary for the heat balance, the excess heat formed by burning of the carbon may be extracted from the carbon burner by withdrawing a portion of the powder from the carbon burner through a second conduit 42 which discharges through a control valve 43 into a stream of air passing through line 44 which serves as a carrier for carrying the powder through a cooler 45 which may be in the form of a waste heat boiler or other suitable heat exchanger for extracting heat from the powder. The cooled powder may then be returned to the carbon burner through conduit 46 which merges with the conduit 29 carrying the suspension of air and powder into the burner 31.

The slurry of powder and liquid scrubbing medium withdrawn from the washer 19 through line 20 may also be injected into the suspension passing through the conduit 29, as illustrated. While this slurry may be passed to the cracking vessel 12, it is preferred to introduce the slurry into the stream passing into the burner in order to avoid contaminating the reaction products with gases formed by vaporization of the washing medium. The conduit 42 may also be provided with one or more aerating lines 47 and 48 for maintaining the powder within the conduit in a fluid state.

By circulating the powder through the cooler 45 as described, the powder is maintained at a uniform temperature level so that the powder discharging into the methane will be at a constant temperature at all times.

In view of the high temperature existing in the equipment, all portions of the equipment having sufficient diameter, such as the cracking vessel 12 and the carbon burner 31, should be internally lagged with suitable insulating medium or refractory material. Those portions of the equipment of relatively small diameter which cannot be conveniently lagged internally should be constructed of heat-resisting alloys such as stellite, or such portions may be provided with internal cooling to protect the metal.

The invention has already been described with specific reference to the cracking of methane to form hydrogen with the formation of residual carbon on the powder. The same equipment with slight modifications lends itself readily to the conversion of hydrocarbon gases or vapors into acetylene or ethylene. The production of acetylene from hydrocarbons likewise involves the high-temperature treatment of hydrocarbon gases or vapors at extremely short contact times, followed by immediate and rapid quenching of the reaction products.

The apparatus illustrated in the drawing will now be described as employed for the cracking of hydrocarbon vapors or gases into acetylene.

Referring to the drawing, the feed introduced through line 10 may comprise methane, as previously described, or other hydrocarbon gas or vapor. This feed discharges into conduit 11 into which the highly heated powder is discharged, as previously set forth. The amount and temperature of the powder introduced should be sufficient to heat the charging stock to a temperature of from 2000° F. to 2500° F. and to supply the heat of cracking. In this operation, the conduit 11 may form the reaction zone, and the vessel 12 may serve as a separating and quenching zone. This reaction requires a relatively short time of contact which can be obtained within the transfer line 11. Following the reaction, it is important to cool the reaction products rapidly to a temperature which will avoid any further side reactions. To this end, the temperature may be immediately reduced to the order of 1000° F. or lower.

The reaction mixture following reaction within the conduit 11 discharges through perforated grid 13 into a dense layer of powder which is maintained at a temperature of the order of 1000° F. or below. To maintain this temperature, a stream of the powder may be continuously withdrawn from the vessel 12 through a conduit 51 which discharges through a control valve 52 into a stream of gas passing through line 53 which serves as a carrier for carrying the powder through heat exchanger 54 in which the powder is cooled to a temperature sufficient to maintain the layer of powder in the vessel 12 at the desired level. The cooled solid is returned to the vessel 12 through line 55. The conduit 51, which serves to withdraw the powder from the vessel 12, may be provided with suitable aerating lines 56 to 58, inclusive, for maintaining the powder in a fluid state, and the height of this conduit may be sufficient to generate the necessary pressure for forcing the powder through the heat exchanger 54 and back into the vessel 12. By circulating the powder through heat exchanger 54 at a sufficient rate the reaction products upon passing into the main portion of the vessel 12 may be immediately quenched to a temperature which will avoid any further undesirable side reactions. The reaction products after passing through the layer of cooled powder in vessel 12 discharge into cyclone separator 15, as previously described. Likewise, a stream of solid is continuously removed from the quenching zone 12 and passed into the carbon burner 31, as earlier described, in which the powder is heated to a temperature sufficient to supply the required heat for the cracking process.

Figure 2:
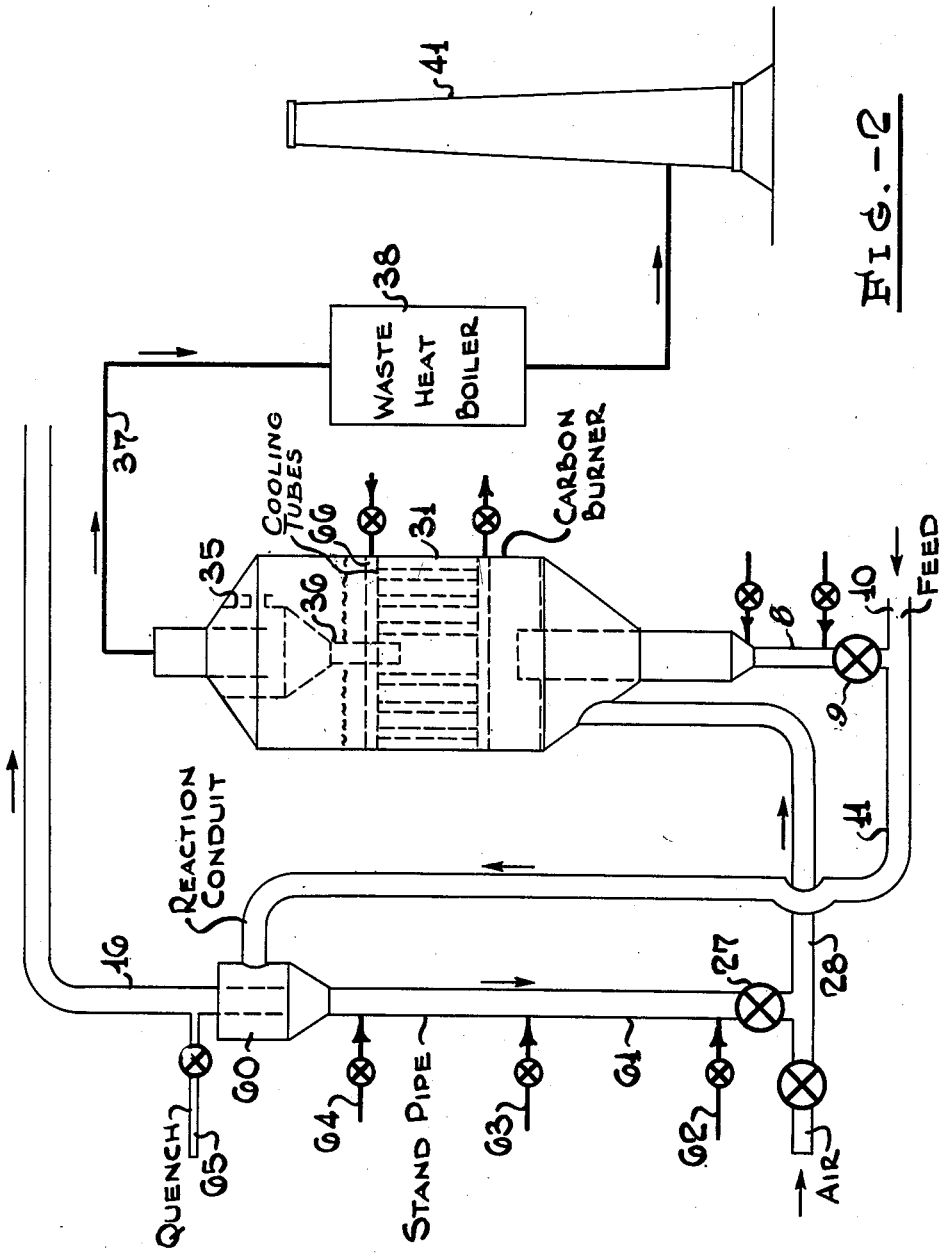

Fig. 2 illustrates a modified form of apparatus in which the enlarged reaction or separating zone has been omitted and in which the reaction is carried out in a vertical conduit, followed by rapid separation of the powder from the reaction products. The reaction products following separation of the powder are then cooled to a temperature to avoid secondary reactions.

Referring to Fig. 2, the feed is introduced into the system through line 10 in the same manner as shown in Fig. 1. The hot powder used for supplying the heat is introduced into the line 10 through conduit 8 having a control valve 9, as previously described with reference to Fig. 1. The resulting suspension of hot powder and feed then passes through the conduit 11 which discharges directly into a cyclone separator 60 or other separating device for effecting rapid removal of the powder from the feed. The powder so separated discharges into a vertical standpipe 61 into which an aerating gas may be admitted at one or more spaced points through lines 62, 63 and 64. The powder so removed discharges through a control valve 27, similar to the control valve 27 in line 23 of Fig. 1, into a stream of air passing through the conduit 28, which corresponds to the conduit 28 illustrated in Fig. 1. This suspension then passes to a carbon burner 31, which is of construction similar to that illustrated in Fig. 1.

The reaction products following separation of the powder therefrom in the cyclone separator are cooled to a temperature sufficient to avoid undesirable side reactions by direct introduction of a quenching medium into line 16 leading from the cyclone separator. This quenching medium may be in the form of either a solid, liquid or gas. The cooled products may then be treated in the same manner illustrated in Fig. 1, such as by passing to a waste heat boiler or other suitable scrubbing device. In cases where the quenching medium is a solid, additional separating device must be employed for separating the solids used as the cooling agent from the reaction products.

In lieu of circulating the powder from the carbon burner 31 through an extraneous heat exchanger 45, as shown in Fig. 1, cooling tubes 66 are shown constructed within the carbon burner. These cooling tubes may be used for removing excess heat from the powder formed during the burning of the carbon. Similar cooling tubes may also be provided in chamber 12 of Fig. 1 when said chamber is used as a quenching zone.

In other respects the apparatus illustrated in Fig. 2 functions in a manner similar to Fig. 1. The apparatus illustrated in Fig. 2 is particularly adaptable for operations in which a relatively low temperature differential is maintained between the reaction zone and the carbon burning zone, which necessitates circulation of relatively larger amounts of powder. The combination of high circulation rates with a correspondingly low temperature differential is of particular advantage when producing cracked gases such as acetylene since it tends to reduce polymerization. When cracking hydrocarbon gases to form acetylene, the feed may be diluted with steam.

It has been assumed in the above description that the amount of solid combustible deposits formed on powder would be sufficient, when burned in the carbon burner, to supply the required heat for the cracking process. In event the amount of combustible deposits formed during the process is insufficient to supply the necessary heat, additional fuel from an extraneous source may be introduced into the carbon burner to make up the deficiency.

Having described the preferred embodiments of the invention, it will be understood that it embraces such other variations and modifications as come within the spirit and scope of the accompanying claims.

What is desired to be protected by Letters Patent is:

1. A process for effecting hydrocarbon reactions in gaseous phase at high temperatures which comprises commingling hydrocarbon gases to be reacted with highly heated refractory powder while said powder is substantially above the reaction temperature, the amount of said powder being sufficient to heat said gas to reaction temperature and supply the heat of reaction, maintaining said hydrocarbon gas in admixture with said powder for a period sufficient to obtain the desired reaction, thereafter passing the total effluent of gaseous reaction products and powder into the bottom portion of an enlarged zone, reducing the velocity of the gases passing upwardly through said enlarged zone sufficiently to cause said powder to separate into a relatively dense, fluid layer in the bottom portion of said zone, removing gaseous reaction products from the top of said zone, separately withdrawing a stream of powder from the bottom portion of said zone below the level of said layer, cooling a portion of the powder so withdrawn to a temperature materially below the desired reaction temperature, returning the powder so cooled to said layer, heating another portion of the powder removed from said enlarged zone to a temperature materially above the desired reaction temperature and commingling said highly heated powder with additional hydrocarbon gas to be reacted.

2. A process for the conversion of normally gaseous hydrocarbons which comprises intermingling preheated gaseous hydrocarbons with a hot refractory powder while said powder is above 1800° F., the amount of said powder being sufficient to rapidly heat said hydrocarbons to the desired reaction temperature, passing the resulting suspension of powder and gases through an elongated reaction zone, thereafter discharging the resulting effluent of gaseous reaction products and powder into the bottom of an enlarged vertical zone in which the velocity of the gases is reduced sufficiently to cause said powder to segregate into a relatively dense, fluid layer in the bottom portion of said enlarged zone, maintaining said layer within said enlarged zone at a temperature materially below the desired reaction temperature to rapidly cool said reaction products and prevent secondary reactions, withdrawing a separate stream of powder from the lower portion of said enlarged zone below the level of said layer, heating at least a portion of the powder so removed to a temperature above 1800° F. and again intermingling said heated powder with additional gaseous hydrocarbons to be converted.

3. The process defined in claim 2 wherein a portion of the powder withdrawn from said enlarged zone is cooled and thereafter returned to said zone.

4. A process for producing acetylene from methane which comprises intermingling preheated methane with a highly heated refractory powder while said powder is at a temperature above 1800° F., the amount of said powder intermingled with said methane being sufficient to heat said methane to a temperature above 1800° F., passing the resulting mixture through an elongated reaction zone, thereafter immediately discharging the suspension into the bottom portion of an enlarged zone wherein the velocity is reduced sufficiently to cause said powder to segregate into a relatively dense, fluid layer in the bottom portion of said zone, withdrawing reaction products from the upper portion of said enlarged zone and maintaining the temperature of said powder within said enlarged zone below 1000° F. to thereby rapidly cool said gaseous reaction products issuing from said elongated reaction zone.

5. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 1800° F. thereafter passing said stream upwardly through an enlarged zone at a reduced velocity controlled to cause said powder to separate into a relatively dense, turbulent layer within said enlarged zone, maintaining said relatively dense layer of powder within said enlarged zone at a temperature materially below said cracking temperature whereby the reaction products rising therethrough will be quenched to a temperature sufficient to avoid undesirable secondary reactions, continuously withdrawing a stream of said powder from said enlarged zone below the level of the dense phase, passing said stream through a heating zone, heating said powder within said heating zone to a temperature materially above said cracking temperature, thereafter remixing said heated powder with additional hydrocarbons to be cracked, withdrawing reaction products from the upper portion of said enlarged zone, and cooling the reaction products so withdrawn.

6. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 1800° F., thereafter passing said stream upwardly through an enlarged zone at a reduced velocity controlled to cause said powder to separate into a relatively dense, turbulent layer within said enlarged zone, continuously withdrawing a stream of said powder from said enlarged zone below the level of the dense phase, continuously cooling a portion of said stream of powder withdrawn from said enlarged zone and returning said cooled portion to said enlarged zone to maintain the temperature of the layer of powder therein materially below said reaction temperature, passing another portion of said stream through a heating zone, heating said powder within said heating zone to a temperature materially above said cracking temperature, thereafter remixing said heated powder with additional hydrocarbons to be cracked, withdrawing reaction products from the upper portion of said enlarged zone and cooling the reaction products so withdrawn.

7. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 180° F. thereafter passing said stream upwardly through an enlarged zone at a reduced velocity controlled to cause said powder to separate into a relatively dense, turbulent layer within said enlarged zone, maintaining said relatively dense layer of powder within said enlarged zone at a temperature materially below the range at which cracking of said hydrocarbons occurs, continuously withdrawing a stream of said powder from said enlarged zone below the level of the dense phase, passing said stream through a heating zone, heating said powder within said heating zone to a temperature materially above said cracking temperature, thereafter remixing said heated powder with additional hydrocarbons to be cracked, withdrawing reaction products from the upper portion of said enlarged zone, and cooling the reaction products so withdrawn.

EDWIN J. GOHR.

REFERENCES CITED

The following references are of record in the file of this patent:

UNITED STATES PATENTS

| Number | Name | Date |
|---|---|---|
| Re. 21,526 | Odell | Aug. 6, 1940 |
| 1,773,611 | Banck | Aug. 19, 1930 |
| 1,917,627 | Wulff | July 11, 1933 |
| 2,191,510 | Whitehurst | Feb. 27, 1940 |
| 2,253,486 | Belchetz | Aug. 19, 1941 |
| 2,303,047 | Hemminger | Nov. 24, 1942 |
| 2,337,684 | Scheineman | Dec. 28, 1943 |
| 2,356,697 | Rial | Aug. 22, 1944 |
| 2,358,888 | Thomas | Sept. 26, 1944 |
| 2,376,190 | Roetheli et al. | May 15, 1945 |
| 2,405,395 | Bahlke et al. | Aug. 6, 1946 |
| 2,407,371 | Jahnig | Sept. 10, 1946 |